United States Patent
Colaitis et al.

(10) Patent No.: US 10,733,712 B2
(45) Date of Patent: Aug. 4, 2020

(54) LOW COST COLOR EXPANSION MODULE FOR EXPANDING COLORS OF AN IMAGE

(71) Applicant: INTERDIGITAL VC HOLDINGS, INC., Wilmington, DE (US)

(72) Inventors: Marie-Jean Colaitis, Cesson-Sévigné (FR); Laurent Cauvin, Chevaigne (FR); Tania Pouli, Le Rheu (FR)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 0 days.

(21) Appl. No.: 16/098,123

(22) PCT Filed: Jan. 20, 2017

(86) PCT No.: PCT/EP2017/051178
§ 371 (c)(1),
(2) Date: Oct. 31, 2018

(87) PCT Pub. No.: WO2017/190850
PCT Pub. Date: Nov. 9, 2017

(65) Prior Publication Data
US 2019/0147572 A1    May 16, 2019

(30) Foreign Application Priority Data
May 4, 2016 (WO) .................. PCT/EP2016/060081

(51) Int. Cl.
*G06T 5/00* (2006.01)
*G06T 5/20* (2006.01)
(Continued)

(52) U.S. Cl.
CPC .................. *G06T 5/009* (2013.01); *G06T 5/20* (2013.01); *G09G 5/06* (2013.01); *G09G 5/10* (2013.01);
(Continued)

(58) Field of Classification Search
CPC . G06T 5/009; G06T 5/20; G06T 2207/20028; G06T 2207/20024;
(Continued)

(56) References Cited

U.S. PATENT DOCUMENTS

| 5,005,074 A | * | 4/1991 | Perlman | ................... H04N 9/78 |
| | | | | 348/665 |
| 2010/0053376 A1 | * | 3/2010 | Fukuda | ................... G06T 5/009 |
| | | | | 348/235 |
| 2016/0180782 A1 | * | 6/2016 | Nakaya | ................. G09G 3/3648 |
| | | | | 345/690 |

FOREIGN PATENT DOCUMENTS

WO    WO2015096955    7/2015

OTHER PUBLICATIONS

Banterle et al., "High Dynamic Range Imaging and Low Dynamic Range Expansion for Generating HDR Content", Computer Graphics Forum, vol. 28, No. 8, Dec. 2009, pp. 2343-2367.
(Continued)

*Primary Examiner* — Saptarshi Mazumder
(74) *Attorney, Agent, or Firm* — Invention Mine LLC

(57) ABSTRACT

The module (700) comprises: —a low pass filter for low pass filtering luminance component of the image, —a first look up table (710) storing precomputed values of a first expansion function of only low pass filtered luminance values, —a second look up table (720) storing precomputed values of a second expansion function of only luminance values, —a processor (740, 760) configured to multiply an output of the second look up table corresponding to an input luminance value of a color to expand by an output of said first look up table corresponding to an input low pass filtered luminance value associated with said input luminance value.

16 Claims, 5 Drawing Sheets

(51) Int. Cl.
*G09G 5/06* (2006.01)
*G09G 5/10* (2006.01)

(52) U.S. Cl.
CPC ............... *G06T 2207/10024* (2013.01); *G06T 2207/20024* (2013.01); *G06T 2207/20028* (2013.01); *G06T 2207/20208* (2013.01); *G09G 2320/0666* (2013.01)

(58) Field of Classification Search
CPC ........... G06T 2207/20208; G06T 2207/10024; G09G 5/10; G09G 5/06; G09G 2320/0666
See application file for complete search history.

(56) References Cited

OTHER PUBLICATIONS

Licciardo et al., "Stream Processor for Real-Time Inverse Tone Mapping of Full-HD Images", IEEE Transactions on Very Large Scale Integration (VLSI) Systems, vol. 23, No. 11, Nov. 2015, pp. 1-9.

Kovaleski et al., "High-quality brightness enhancement functions for real-time reverse tone mapping", The Visual Computer, International Journal of Computer Graphics, vol. 25, No. 5-7. Mar. 2009, pp. 539-547.

Huo et al., "Physiological inverse tone mapping based on retina response", The Visual Computer, International Journal of Computer Graphics, vol. 30, No. 5, Sep. 2013, pp. 507-517.

Huo et al., "A LDR Image Expansion Method for Displaying on HDR Screen", 2013 IEEE International Conference on Computational Problem-Solving (ICCP), Jiuzhai, China, Oct. 26, 2013, pp. 234-237.

Banterle et al., "A Framework for inverse tone mapping", The Visual Computer, International Journal of Computer Graphics, vol. 23; No. 7, May 2007, pp. 467-478.

\* cited by examiner

LOW COST COLOR EXPANSION MODULE FOR EXPANDING COLORS OF AN IMAGE

This application claims the benefit, under 35 U.S.C. § 365 of International Application PCT/EP2017/051178, filed on Jan. 20, 2017, which was published in accordance with PCT Article 21(2) on Nov. 9, 2017, in English, and which claims the benefit of International Application PCT/EP2016/060081, filed on May 4, 2016.

TECHNICAL FIELD

The present principles relate generally to the field of high dynamic range imaging and expanding the dynamic range of low dynamic range content to prepare such content for display devices having notably high peak luminance.

BACKGROUND

Recent advancements in display technology are beginning to allow an extended range of chrominance, luminance and contrast values to be displayed. Technologies allowing for extensions in the range for luminance or brightness in image content are known as high dynamic range imaging, often shortened to HDR. HDR technologies focus on capturing, processing and displaying content of a wider dynamic range.

Although a number of HDR display devices have appeared, and cameras capable of capturing images with an increased dynamic range are being developed, there is still very limited HDR content available. While recent developments promise native capture of HDR content in the near future, they do not address existing content.

To prepare conventional, herein referred to as LDR for low dynamic range, content for HDR display devices, reverse or inverse tone mapping operators (ITMO) or color expansion operators can be employed. Such methods process notably the luminance information of colored areas in the image content with the aim of recovering or recreating the appearance of the original scene. Typically, ITMOs take a conventional (LDR) image as input, expand the luminance range of the colored areas of the image in a global manner, and subsequently process highlights or bright regions locally to enhance the HDR appearance of colors in the image.

Although several ITMO solutions exist, they focus at perceptually reproducing the appearance of the original scene and rely on strict assumptions about the content. Additionally, most expansion methods proposed in the literature are optimized towards extreme increases in dynamic range.

Typically, HDR imaging is defined by an extension in dynamic range between dark and bright values of luminance in colored areas combined with an increase in the number of quantization steps. To achieve more extreme increases in dynamic range, many methods combine a global expansion with local processing steps that enhance the appearance of highlights and other bright regions of images. Known global expansion steps proposed in the literature vary from inverse sigmoid, to linear or piecewise linear.

To enhance bright local features in an image, it is known to create a luminance expansion map, wherein each pixel of the image is associated with an expansion value to apply to the luminance of this pixel. In the simplest case, clipped regions in the image can be detected and then expanded using a steeper expansion curve, however such a solution does not offer sufficient control over the appearance of the image.

SUMMARY

These and other drawbacks and disadvantages of the prior art are addressed by various described embodiments, which are directed to methods and apparatus for expanding the dynamic range of low dynamic range content to prepare such content for display devices having notably high peak luminance.

An object of the invention is a color expansion module for expanding colors of an image, wherein said colors are represented in a color space separating a luminance component from chrominance components, comprising:
a low pass filter for low pass filtering said luminance component,
a first look up table storing precomputed values of a first expansion function of only low pass filtered luminance values,
a second look up table storing precomputed values of a second expansion function of only luminance values,
a processor configured to multiply an output of said second look up table corresponding to an input luminance value of a color to expand by an output of said first look up table corresponding to an input low pass filtered luminance value associated with said input luminance value.

Such a color expansion module is particularly advantageous and cheap, because it uses only two look up table of small size.

Preferably, this module is incorporated in an electronic device such as: a TV set; a mobile device; a communication device; a game device; a tablet; a smartphone; a laptop; a camera; an encoding chip; a server.

According to one general aspect, a method is also provided for expanding the dynamic range of low dynamic range content to prepare such content for display devices having notably high peak luminance. The method for expanding colors of an image, wherein colors are represented in a color space separating a luminance component from chrominance components, comprises low pass filtering this luminance component, and expanding a value range for said luminance component by scaling said low pass filtered luminance component exponentially using an exponent map. An expanded value of luminance is then obtained to represent expanded colors of the image in a new HDR version. Such expanded colors may notably be used to reproduce the image on a display device having a higher peak luminance.

Preferably, this method further comprises:
high pass filtering said luminance component,
scaling said high pass filtered luminance component exponentially using a detail map,
weighting said scaled low pass filtered luminance component by scaled high pass filtered luminance component.

An expanded value of luminance is then obtained to represent expanded colors of the image in a new HDR version in which details are enhanced to compensate for the loss of details coming from the low pass filtering of the luminance component.

Preferably, said high pass filtering is obtained by dividing said luminance component by said low pass filtered luminance component.

Preferably, said exponent map is computed according to an exponent function of said low pass filtered luminance component, and said weighted scaled low pass filtered luminance component is a product:
of said low pass filtered luminance component scaled exponentially using said exponent function and using also a first detail function of only said low pass filtered luminance component and of said luminance component scaled exponentially using a second detail function of only said luminance component.

Such a definition of this weighted scaled low pass filtered luminance component corresponds to equation (15) in the main embodiment below.

Advantageously, the first term of this product is related only to low pass filtered luminance and not directly to luminance, and the second term of this product in then related to luminance and not directly to low pass filtered luminance. Such an advantage allows to use only two separate one dimension LUTs to compute the weighted scaled low pass filtered luminance component, i.e. the expanded luminance.

Preferably, the method further comprises:
expanding the value range of at least one chrominance component of said image by a chrominance expansion factor.

In a first variant, said chrominance expansion factor corresponds to said expanded luminance component normalized by said luminance component. See equations (6) and (7) in the main embodiment below.

In a second variant, said chrominance expansion factor is a function of said exponent map scaled by said expanded luminance component normalized by said luminance component. See equations (8) and (9) in the main embodiment below.

In a third preferred variant, said chrominance expansion factor is a function of said exponent map or of said low pass filtered luminance component, said function being scaled by said expanded luminance component normalized by said low pass filtered luminance component. See equations (10) and (11) in the main embodiment below.

An object of the invention is also a non-transitory storage medium carrying instructions of program code for executing steps of the above color expansion method, when said program is executed on a computing device An object of the invention is also method for expanding colors of an image, wherein colors are represented in a color space separating a luminance component from chrominance components, comprising:
low pass filtering this luminance component,
obtaining an expanded value of said luminance component by computing a product of a first function $f(Y_{low})$ of only said low pass filtered luminance component with a second function $g(Y)$ of only said luminance.

According to another general aspect, an apparatus is provided for expanding the dynamic range of low dynamic range content to prepare such content for display devices having notably high peak luminance. The apparatus comprises a low pass filter operating on at least one component in an image and, a display device having a higher peak luminance value than the at least one image component prior to the low pass filtering, thereby expanding a value range of the at least one component in the image having a lower peak luminance.

According to another general aspect, a second method is provided for expanding a value range for at least one component in the image in order to reproduce said image on a display device having a higher peak luminance. The method comprises scaling a low pass filtered luminance component exponentially using an exponent map, and weighting the scaled low pass filtered luminance component by a luminance component of the image scaled exponentially by a function of the luminance component.

According to another general aspect, a third method is provided for expanding a value range for at least one component in the image in order to reproduce said image on a display device having a higher peak luminance. The method includes the features of the first method, and further comprises generating an exponent map computed on a single pixel basis, and computing an enhancement map, wherein the enhancement map is a function of the luminance component and the low pass filtered luminance component. The aforementioned expansion comprises applying the exponent map exponentially on the low pass filtered luminance component, and scaling the expanded value range for at least one component with the enhancement map.

According to another general aspect, a second apparatus is provided for expanding a value range for at least one component in the image in order to reproduce said image on a display device having a higher peak luminance. The apparatus comprises a first lookup table storing values of a low pass filtered luminance component scaled exponentially using an exponent map. The apparatus further comprises a second lookup table storing values of the luminance component scaled exponentially by a scaling parameter. The apparatus further comprises a first multiplier that combines output of the first and second lookup tables, a third lookup table storing an exponent map to be applied to the low pass filtered luminance component, and a second multiplier that combines chrominance components with the output of the third lookup table. The apparatus further comprises a third multiplier that combines the luminance component with the output of the first multiplier to generate an expanded luminance component. The apparatus further comprises fourth and fifth multipliers operating on each of the chrominance components that combine output of the first multiplier with output of the second multiplier to generate expanded chrominance components.

According to another general aspect, a third apparatus is provided for expanding a value range for at least one component in the image in order to reproduce said image on a display device having a higher peak luminance. The apparatus comprises a first processor configured to generate an exponent map computed on a single pixel basis. The apparatus further comprises a second processor configured to compute an enhancement map, wherein the enhancement map is a function of the luminance component and the low pass filtered luminance component, and also comprises a third processor configured to expand the low pass filtered luminance component exponentially using the exponent map and scaling the result with the enhancement map.

The details of one or more implementations are set forth in the accompanying drawings and the description below. Even if described in one particular manner, it should be clear that implementations can be configured or embodied in various manners. For example, an implementation can be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

The present principles can be better understood in accordance with the following exemplary figures, in which.

DETAILED DESCRIPTION

Figure 1:
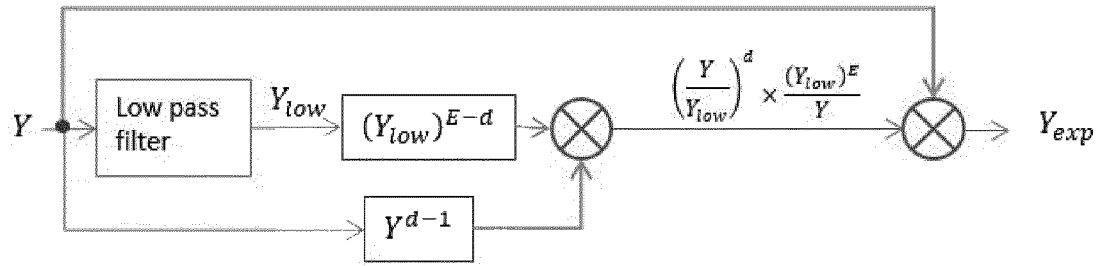
FIG. 1 shows one embodiment of an implementation of the present principles.

As mentioned, to enhance bright local features in an image, it is known to create a luminance expansion map, wherein each pixel of the image is associated with an expansion value to apply to the luminance of this pixel. In the simplest case, clipped regions in the image can be detected and then expanded using a steeper expansion curve; however, such a solution does not offer sufficient control over the appearance of the image.

A more controllable luminance expansion solution is given in the document WO2015096955 which discloses a luminance expansion of an image based on the application of an exponent to the image luminance, wherein the exponent is obtained from a low-pass filtered version of the image luminance. However, in the present case, the luminance exponential expansion function is applied to a low-pass filtered version of the image luminance, rather than to the image luminance itself. As the exponent applied to the luminance depends on low-pass filtered version of the image luminance, the expansion is then globally a function of only one variable (namely the low-pass filtered version of the image luminance such that $Y_{exp}=f(Y_{low})$) instead of two variables, the luminance itself Y and the low-pass filtered version of the luminance $Y_{low}$. Notably because of this difference, the current invention may be advantageously implemented using small size look-up tables, which makes it more suitable for hardware applications.

The described embodiments are directed to methods and apparatus for expanding the dynamic range of low dynamic range content, notably to prepare such content for display devices having high peak luminance.

An aim of the present expansion methods is to expand the luminance channel Y of colors of an image I in order to obtain an expanded luminance $Y_{exp}$ for these colors.

The luminance channel Y to expand (and to weight—see below) can be obtained in a manner known per se by transforming data representing colors of the image into a color space separating chrominance from luminance, such as the YUV color space, for example.

To obtain the expanded luminance $Y_{exp}$, a low-pass filtered version of the luminance Y is first computed, denoted as $Y_{low}$. A per-pixel exponent map E can be computed as a function of this low-pass filtered version of the luminance Y. Additionally, an enhancement map $Y_{enhance}$ can be obtained as a function of a high-pass filtered version of the luminance Y. This enhancement map $Y_{enhance}$ is used as a weight to apply to an intermediate expanded luminance. Such a high-pass filtered version of the luminance Y is preferably obtained by comparing this luminance Y and the low-pass filtered version $Y_{low}$, notably by dividing this luminance Y by its low-pass filtered version $Y_{low}$. This enhancement map $Y_{enhance}$ encodes grain and other details in the image and can be used to recover details lost by the low-pass filtering and enhance the visibility of such details after an intermediate expansion.

The final expanded luminance $Y_{exp}$ is obtained by applying the per pixel exponent E to the low-pass version $Y_{low}$, resulting in an intermediate expanded luminance and finally multiplying this intermediate expanded luminance by $Y_{enhance}$ such that $Y_{exp}=(Y_{low})^E \times Y_{enhance}$) where E is obtained from an exponent map.

To reconstruct all color components of the expanded color image $I_{exp}$, the chromatic channels of colors of the image I (e.g. U and V) are preferentially scaled according to the relation between Y and $Y_{exp}$, notably according to the ratio $Y_{exp}/Y$, obtaining accordingly $U_{exp}$ and $V_{exp}$.

To obtain the final expanded image, the inverse color space transform is applied, to convert from the luminance-chrominance representation $Y_{exp}$, $U_{exp}$ and $V_{exp}$ back to the original color space of the image (for example, RGB).

As explained below in relation with equation (15), notably when the exponent map E is computed as an exponent function $E(Y_{low})$ of $Y_{low}$ and notably when the high-pass filtered version of the luminance Y which is used to enhance details is obtained by dividing the luminance Y by $Y_{low}$, the expansion may be approximated through only two LUTs that simplify processing in hardware applications. This is described as an alternative embodiment below, referring to LUT1 and LUT2.

More details will now be given about the above luminance expansion method.

To compute the low-pass version of luminance $Y_{low}$, in one embodiment, a 2-dimensional Gaussian filter is used to compute the low-pass version of the luminance, which is denoted as $Y_{low}$. The standard deviation σ of the Gaussian filter can be set for example to a value of 2, while the kernel size is set to a small value, for example, 3×3, 3×5, 5×5 etc.

In another embodiment, the low-pass version of the luminance may be computed using a separable Gaussian filter, whereby, for example, the horizontal dimension of the luminance Y is filtered first with a 1D Gaussian filter, and its output is then filtered in the vertical dimension with another 1D Gaussian filter. Or, the order could be reversed so that vertical filtering is done first followed by horizontal filtering.

To compute the exponent map E as an exponent function of $Y_{low}$, in one specific but not limiting embodiment, the following process is used. For a given pixel p, the exponent E is given by the following equation:

$$E=a(Y_{low})^2+bY_{low}+c=E(Y_{low}) \qquad (1)$$

where the parameters a, b and c are computed depending on the maximum desired output luminance value of the expanded image, which we denote by $L_{max}$. For example, $L_{max}$ can be set to a value between 500 nits and 2000 nits.

All pixel expansion exponent values $E(Y_{low})$ that are obtained from a per-pixel expansion exponent map E(p) when they are combined with a per-pixel map of low-pass luminance values $Y_{low}$.

To compute the enhancement map $Y_{enhance}$, the following equation is used:

$$Y_{enhance}=\left(\frac{Y}{Y_{low}}\right)^d \qquad (2)$$

where the detail parameter d can be set for instance to d=1.25. $Y_{enhance}$ in this case is a function of both the image luminance Y and the low-pass version $Y_{low}$. Note that the ratio $$\left(\frac{Y}{Y_{low}}\right)$$

corresponds to one way of high pass filtering the luminance Y, in which high pass filtering is obtained by dividing the luminance component by the low pass filtered luminance component. Other known way of high pass filtering the luminance Y can be used instead.

Note that the detail parameter d can be pixel mapped into a so-called detail map which is therefore used to scale exponentially the high pass filtered luminance component.

Finally, the final expanded luminance $Y_{exp}$ is obtained as follows:

$$Y_{exp} = (Y_{low})^{E(Y_{low})} \times Y_{enhance} \qquad (3)$$

By replacing $Y_{enhance}$ in the above with the right-hand side of equation (2), we can also reformulate equation (3) as:

$$Y_{exp} = (Y_{low})^{E(Y_{low})} \times \left(\frac{Y}{Y_{low}}\right)^d \qquad (4)$$

In this equation (4), the scaled low pass filtered luminance component $(Y_{low})^{E(Y_{low})}$ is weighted by the exponentially scaled high pass filtered luminance component $$\left(\frac{Y}{Y_{low}}\right)^d.$$

Equation (4) can be written as follows:

$$Y_{exp} = (Y_{low})^{(E(Y_{low})-d)} \times Y^{(d-1)} \times Y \qquad (5)$$

Note that equations (3), (4) and (5) are mathematically equivalent.

FIG. 1 shows one embodiment of an implementation of the present principles.

After obtaining the final expanded luminance $Y_{exp}$ following equations (3-4-5), the chromatic channels of the colors of the image are preferably expanded accordingly. In one embodiment, where the luminance-chrominance representation used for colors is the YUV color space, the input chromatic channels are given by U and V. In a specific and non-limiting embodiment, their scaled counterparts, denoted $U_{exp}$ and $V_{exp}$ can be obtained as follows:

$$U_{exp} = U\left(\frac{Y_{exp}}{Y}\right) \qquad (6)$$

$$V_{exp} = V\left(\frac{Y_{exp}}{Y}\right) \qquad (7)$$

In equations (6) and (7), chrominance components are expanded using a chrominance expansion factor corresponding to expanded luminance component normalized by said luminance component.

In order to enhance the saturation of the image, the chromatic channels can be additionally scaled according to a parameter E' depending on the exponent map E and/or on $Y_{low}$. In this case, the expanded chromatic channels $U_{exp}$ and $V_{exp}$ are computed as follows instead of using equations (6-7):

$$U_{exp} = U\left(\frac{Y_{exp}}{Y}\right)E'(E) \text{ or } U_{exp} = U\left(\frac{Y_{exp}}{Y}\right)E'(Y_{low}) \qquad (8)$$

$$V_{exp} = V\left(\frac{Y_{exp}}{Y}\right)E'(E) \text{ or } V_{exp} = V\left(\frac{Y_{exp}}{Y}\right)E'(Y_{low}) \qquad (9)$$

The chromatic channels $U_{exp}$ and $V_{exp}$ are finally recombined with the expanded luminance channel $Y_{exp}$ to form the colors of the final HDR image.

FIG. 2(*a*) shows an embodiment of an implementation of the above processing of a luminance and two chrominance components, in which six multipliers are needed. FIG. 2(*b*) shows how reversing the order of multipliers in the chroma channel can actually save one multiplier because a single multiplier is used to form $(Y_{exp}/Y)E'$ which is then multiplied by each chroma channel with two additional multipliers.

In another implementation, the expanded chromatic channels $U_{exp}$ and $V_{exp}$ are computed as follows instead of using equations (8-9):

$$U_{exp} = U\left(\frac{Y_{exp}}{Y_{low}}\right)E'(E) \text{ or } U_{exp} = U\left(\frac{Y_{exp}}{Y_{low}}\right)E'(Y_{low}) \qquad (10)$$

$$V_{exp} = V\left(\frac{Y_{exp}}{Y_{low}}\right)E'(E) \text{ or } V_{exp} = V\left(\frac{Y_{exp}}{Y_{low}}\right)E'(Y_{low}) \qquad (11)$$

In equations (6) and (7), chrominance components are expanded using a chrominance expansion factor which is a function of the exponent map or of the low pass filtered luminance component, scaled by said expanded luminance component normalized by said luminance component.

FIG. 3(*a*) is a revised version of FIG. 2(*a*), updated to follow this implementation. Similarly to FIG. 2(*b*), FIG. 3(*b*) shows how reversing the order of multipliers in the chroma channel can actually save one multiplier because a single multiplier is used to form $(Y_{exp}/Y)E$ which is then multiplied by each chroma channel with two additional multipliers.

A specific embodiment will now be described which allow advantageously to compute the expanded luminance $Y_{exp}$ from only two LUTs, notably when the detail parameter varies.

In equation (5), the detail parameter d exponentially scaling on one hand $Y_{low}$ and on the other hand Y can be set to a constant, e.g. 1.25 like in Equation (2), or can vary according to Y and/or to $Y_{low}$.

For instance, notably when exponentially scaling $Y_{low}$, the detail parameter can vary as follows according to a first detail function d1 depending on the value of $Y_{low}$:

$$d1 = d1_{max} - (d1_{max} - d1_{min}) \times \left(\frac{255 - Y_{low}}{255}\right) = d1(Y_{low}) \qquad (12)$$

where, in a first implementation $d1_{min}=1.3$ and $d1_{max}=1.5$, and, in a second implementation $d1_{min}=1.4$ and $d1_{max}=1.8$.

Other implementations in which the function d1 is a function of only $Y_{low}$ can be envisaged without departing from the invention.

That means that, in equation (5), the details notably applied on $Y_{low}$ depend on $Y_{low}$.

In Equation (5), notably when exponentially scaling Y, the detail parameter can vary according to a second detail function d2 depending on the value of Y, for instance as follows:

$$d2 = d2_{max} - (d2_{max} - d2_{min}) \times \left(\frac{255-Y}{255}\right) = d2(Y) \quad (13)$$

where in one implementation $d2_{min}$=1.3 and $d2_{max}$=1.7. That means that, in equation (4), the details notably applied on Y depend on Y.

Other implementations in which d2 is a function of only Y can be envisaged without departing from the invention.

Using a detail function d2 which depends on Y when it exponentially scales Y and a detail function d1 which depends on $Y_{low}$ when it exponentially scales $Y_{low}$, we can also reformulate equation (1), (2) and (3) as:

$$Y_{exp} = (Y_{low})^{E(Y_{low})} \times Y^{d2(Y)} \times Y_{low}^{-d1(Y_{low})} \quad (14)$$

Which is the same as:

$$Y_{exp} = (Y_{low})^{(E(Y_{low}) - d1(Y_{low}))} \times Y^{d2(Y)} \quad (15)$$

Or $$Y_{exp} = (Y_{low})^{(E(Y_{low}) - d1(Y_{low}))} \times Y^{(d2(Y)-1)} \times Y \quad (15')$$

where the function d1( ) can follow equation (12) when applied to $Y_{low}$ and the function d2( ) can follow equation (13) when applied to Y. That means that in equation (15), the details applied on $Y_{low}$ depend only on $Y_{low}$, and the details applied on Y depend only on Y.

Note that in all the above equations, the details functions d1 and d2 can vary in a non-linear way in function of Y or $Y_{low}$, instead of varying linearly as in the specific examples given above in equations (12) and (13).

Figure 3A:
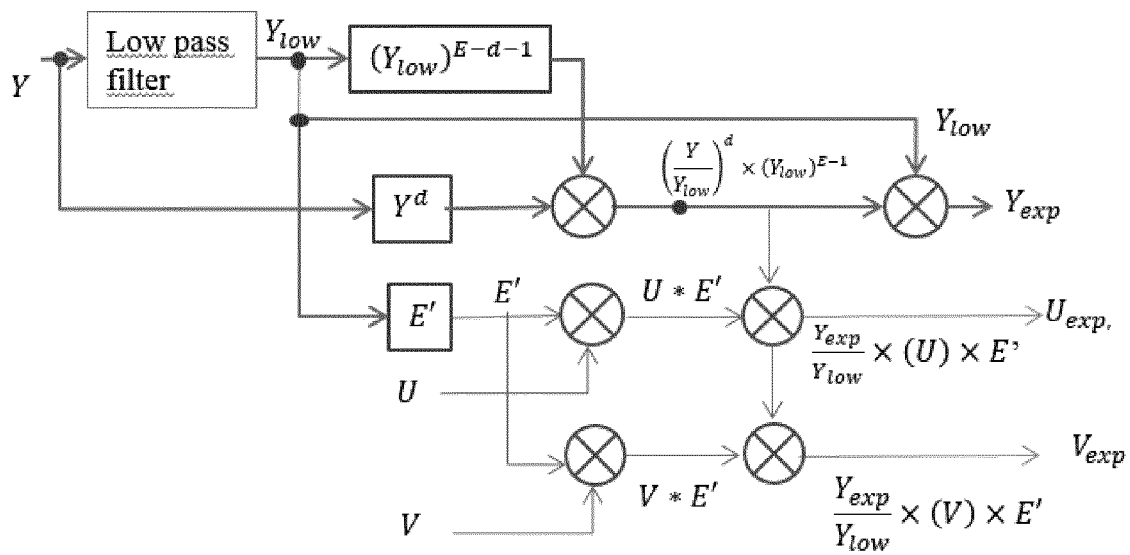
FIG. 3 is a revised version of the embodiment of FIG. 2.
Figure 3B:
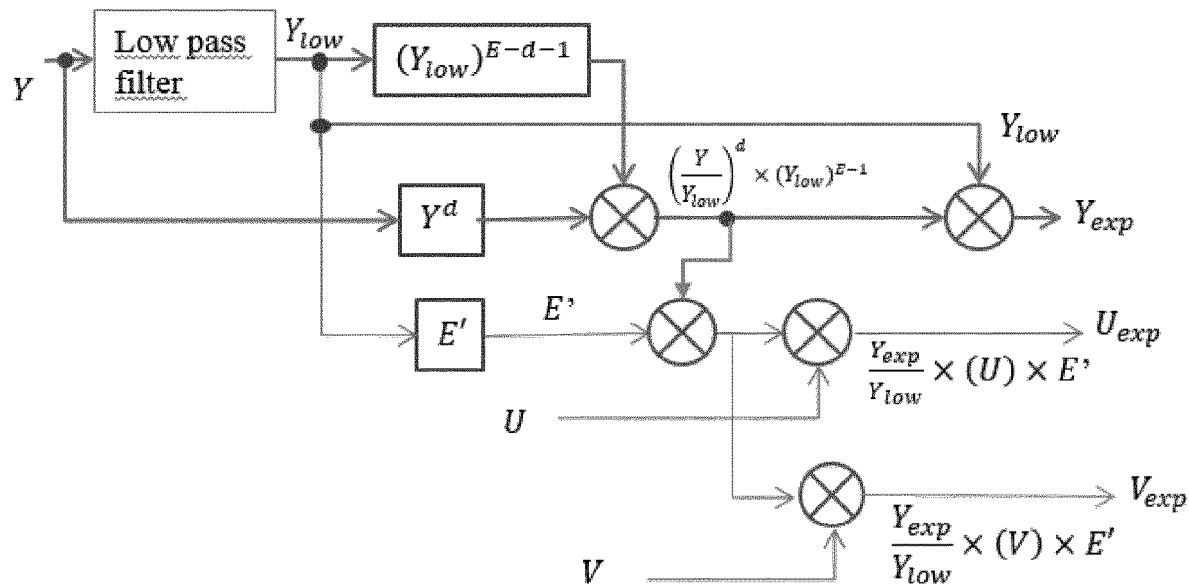
Figure 5:
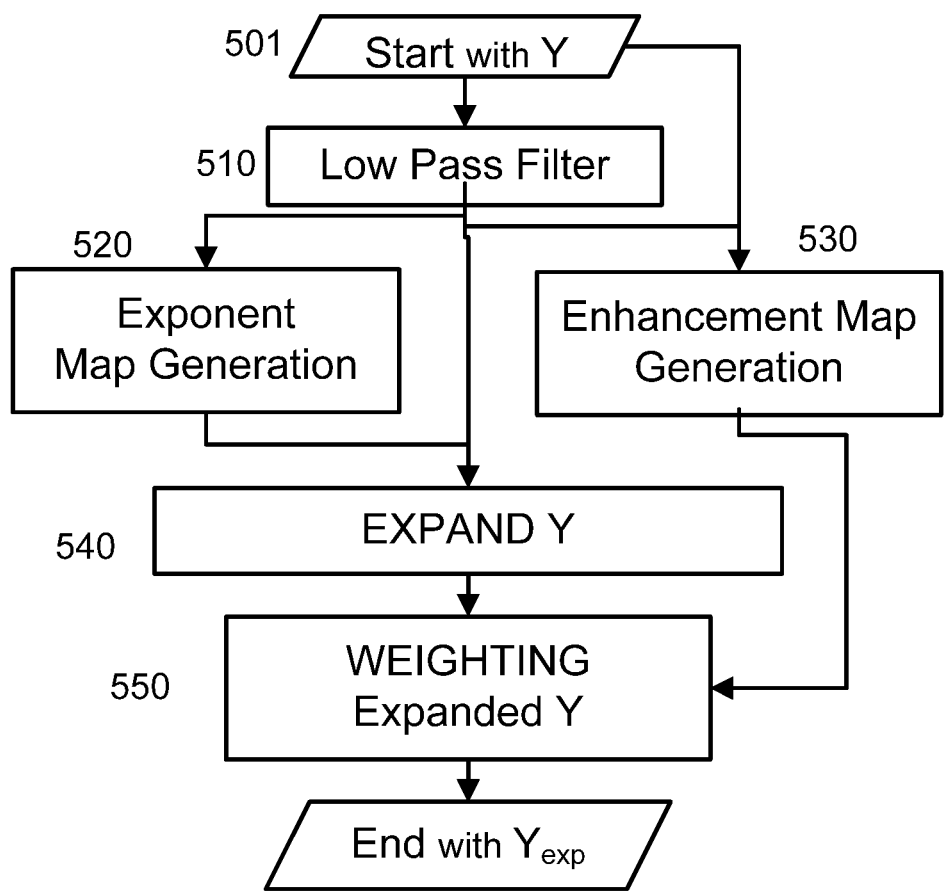
FIG. 5 shows a second embodiment of a method under the present principles.

As explained below, such an implementation of the luminance expansion method with a first detail function d1( ) depending on $Y_{low}$ when applied to the exponent affecting $Y_{low}$ and of a second detail function d2( ) depending on Y when applied to the exponent affecting Y (as in equations 15 and 15' above) is particularly advantageous to minimize the memory size required for the hardware. In such an implementation illustrated on FIGS. 2a and 2b, the following functions of a unique variable are used:

a) A first expansion function $f(Y_{low})=(Y_{low})^{(E(Y_{low})-d1(Y_{low}))}$ which depends uniquely on $Y_{low}$
b) A second expansion function $g(Y)=Y^{(d2(Y)-1)}$ which depends uniquely on Y In such another implementation illustrated on FIGS. 3a and 3b, the following functions of a unique variable are used:

a) A first expansion function $f''(Y_{low})= (Y_{low})^{(E(Y_{low})-d1(Y_{low})-1)}$ which depends uniquely on $Y_{low}$
b) A second expansion function $g'(Y)=Y^{d2(Y)}$ which depends uniquely on Y FIG. 5 shows one embodiment of a method 500 for expanding luminance component of an image. The method commences at Start block 501 which provides luminance component Y and proceeds to block 510 for low pass filtering the luminance component. The method also proceeds to block 520 for generating an exponent map from low pass filtered luminance values provided by block 510, computed on a per pixel basis. Control proceeds from block 501 providing luminance and from block 510 providing low pass filtered luminance to block 530 for generating an enhancement map, wherein the enhancement map is a function of the luminance component and the low pass filtered luminance component (see equation 2 above). Control also proceeds from block 510 and block 520 for expanding an image component value range, by applying the exponent map from block 520 exponentially on the low pass filtered luminance component from block 510. From block 540, control proceeds to block 550 for weighting the expanded image component value range using the enhancement map generated from block 530.

We will now detail how such implementations of the above luminance expansion method may be advantageous in hardware requirement.

In low cost hardware applications, complex computations of functions (as exponential functions are) are very often replaced by Look Up Tables (LUTs). Here, thanks to the new formulation of the expanded luminance $Y_{exp}$ according to equation (15) or (15'), a simpler LUT architecture can be advantageously used to implement the expansion method, using a first LUT with output values corresponding to precomputed values of the first expansion function depending only on $Y_{low}$ and a second LUT with output values corresponding to precomputed values of the second expansion function depending only on Y.

In such an hardware implementation which is detailed below, the first LUT is addressed by $Y_{low}$ entries and embeds for each value of $Y_{low}$ (for example 0 to 255 if $Y_{low}$ is coded using 8 bits, leading to a LUT with a depth size of 255 data) for instance computation results of a first expansion function:

$f(x)=x^{(E(x)-d1(x))}$ with $x$ integer in the [0 . . . 255] range while the second LUT is addressed by Y entries and embeds for each value of Y (for example 0 to 255 if Y is coded using 8 bits, leading to a LUT with a depth size of 256 data) for instance computation results of a second expansion function:

$g(x)=x^{(d2(x)-1)}$ with $x$ real number in the [0 . . . 255] range

Figure 2A:
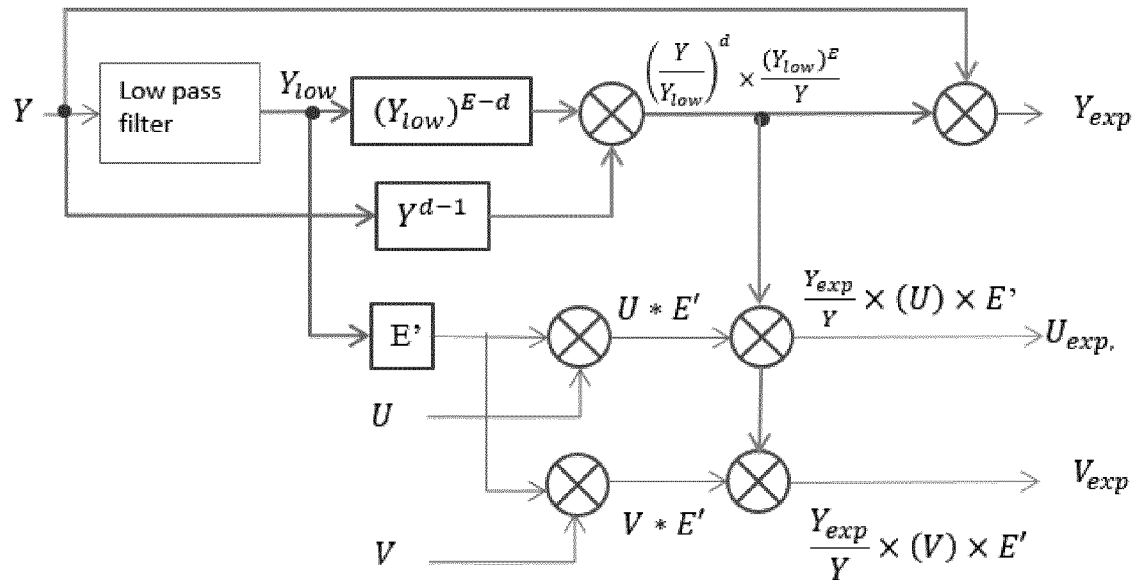
FIG. 2 shows two embodiments of an implementation of the processing of a luminance and two chrominance components.
Figure 2B:
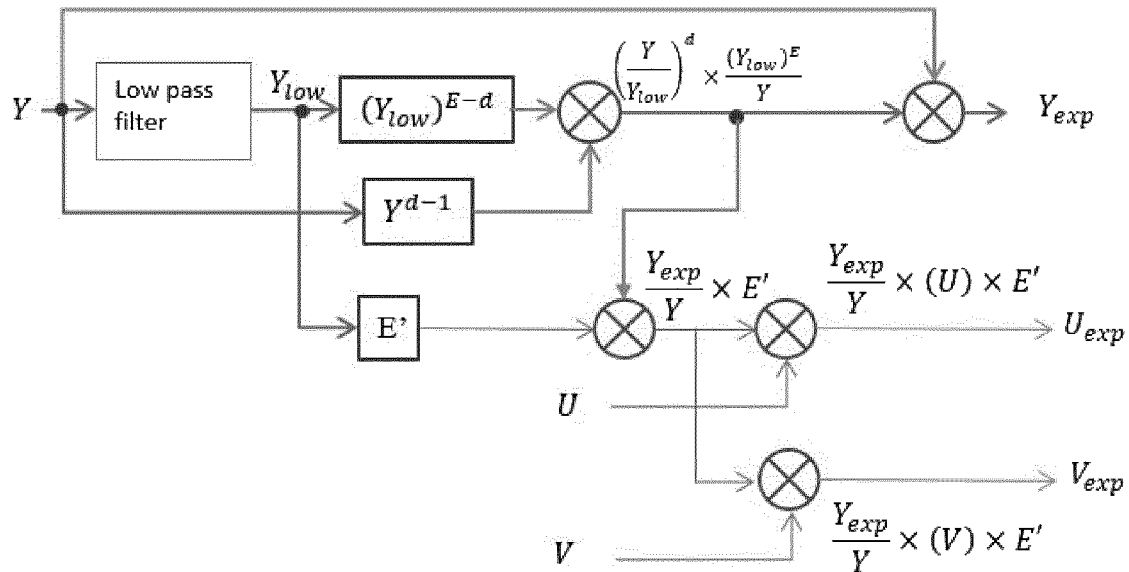
Figure 7:
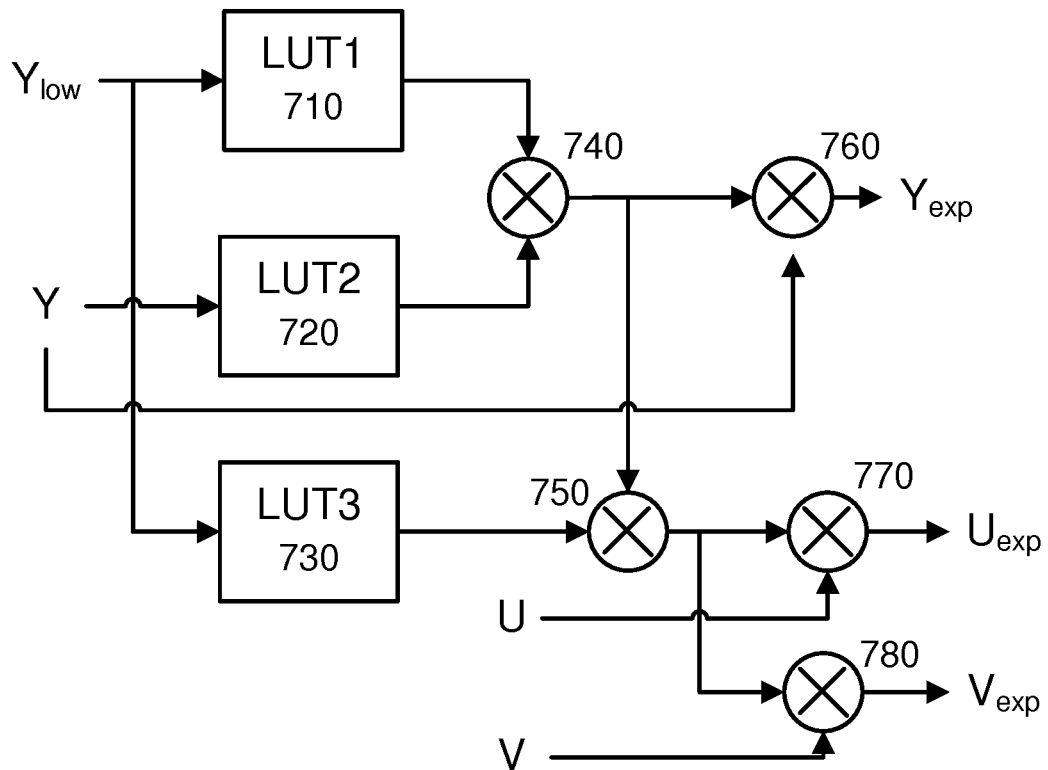
FIG. 7 shows an embodiment of a color expansion apparatus under the present principles, focused on LUTs and multipliers.

Notice that, alternatively, both LUTs can be addressed using data with more than 8 bits, for example n=10 bits (Y and $Y_{low}$ are then integers in the [0 . . . 1023] range). In this case, the input data Y and Ylow are scaled to match the [0 . . . 255] range used in the embedded functions:

$x'=x*255/(2^n-1)$ $f(x)=x^{(E(x')-d1(x'))}$ with $x$ integer in the [0 . . . 1023] range $g(x)=x^{(d2(x)-1)}$ with $x$ integer in the [0 . . . 1023] range In a first embodiment of the present invention dedicated to hardware, the two function blocks $(Y_{low})^{E-d1}$, $Y^{d2-1}$ dedicated to luminance expansion and the function block E' dedicated to chrominance expansion that are described in FIGS. 2a and 2b are replaced by look-up tables LUT1, LUT2 and LUT3 of FIG. 7 (see below). In a second embodiment of the present invention dedicated to hardware, these three function blocks $(Y_{low})^{E-d1-1}$, $Y^{d2}$ and E' described in FIG. 3a or 3b are similarly replaced by three look-up tables. As memory size is also an important criterion in the choice of a hardware architecture, the luminance expansion method described above of using two separate functions $f(Y_{low})$ and $g(Y)$ of only one variable (respectively $Y_{low}$ and Y)—compared to one function (see equation 4 above) of two variables $Y_{low}$ and Y in the prior art—is particularly well-adapted to hardware applications in which this functions are replaced by LUTs, notably because it allows to reduce dramatically the required memory size of LUTs (256 entries in LUT1 if $Y_{low}$ is 8 bits data+256 entries in LUT1 if Y is 8 bits data) compared to one LUT with $Y_{low}$ and Y entries (64 k entries in LUT if both $Y_{low}$ and Y are 8 bits data).

As illustrated on FIGS. 2a, 2b, 3a and 3b and notably on FIG. 7, only three LUTs and six or five multipliers are needed to implement color expansion and details recovery/enhancement once the low pass filtering is done. The low pass filtering step itself is something known in hardware implementations, and can be implemented in a manner known per se. Referring to these figures, the three LUTs are for instance as follows:

a) The first LUT—LUT1—provides values for the first expansion function with entries based only on one variable, $Y_{low}$
b) The second LUT—LUT2—provides values for the second expansion function with entries based only on one variable, Y
c) The third LUT—LUT3—is used for chrominance expansion, provides E' when addressed by $Y_{low}$ Among the advantages of the present approach relative to prior methods, this invention has been optimized to ease the implementation in HW and to use three independent small LUTs. It can use a 2D separable symmetrical filter with a reasonable aperture, a few look-up tables (only 3 in FIGS. 2 and 3) and a few multiplications (only 5 in FIGS. 2(b) and 3b).

Again, a main enabler to ease the HW implementation is that the dynamic expansion is applied on the "filtered luminance" and not on the luminance itself as in WO2015096955, while keeping the same expansion factor E and the same low pass filtered luminance signal $Y_{low}$. Thus instead of having a function of two different variables (luminance and filtered luminance) for the expansion of luminance, this invention uses two functions of only one variable which are each implemented by one LUT which has small size, because it has only one variable entry.

In order to keep the same quality after the expansion, the sharpening of details has also been modified to recover details on the expanded filtered luminance. This modification has also made it possible to lower the number of operations for computing the final expanded luminance.

Figure 4:
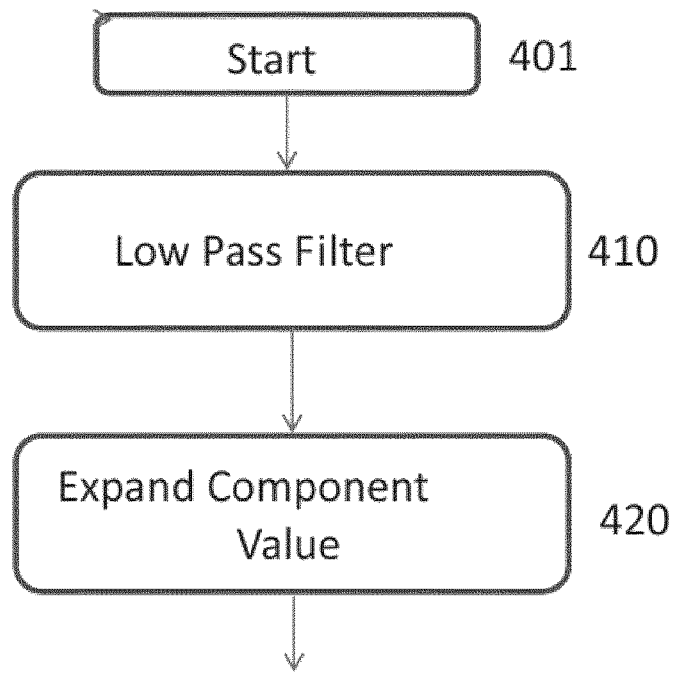
FIG. 4 shows an embodiment of a method under the present principles.

FIG. 4 shows one embodiment of a method 400 for implementing the present principles. The method begins with Start block 401 and proceeds to a block 410 for low pass filtering of a luminance component of an image. Control proceeds from block 410 to block 420 for expanding colors of at least one image component in order to reproduce the image on a display device having a higher peak luminance by using the low pass filtered luminance to produce expanded colors of a HDR image.

Figure 6:
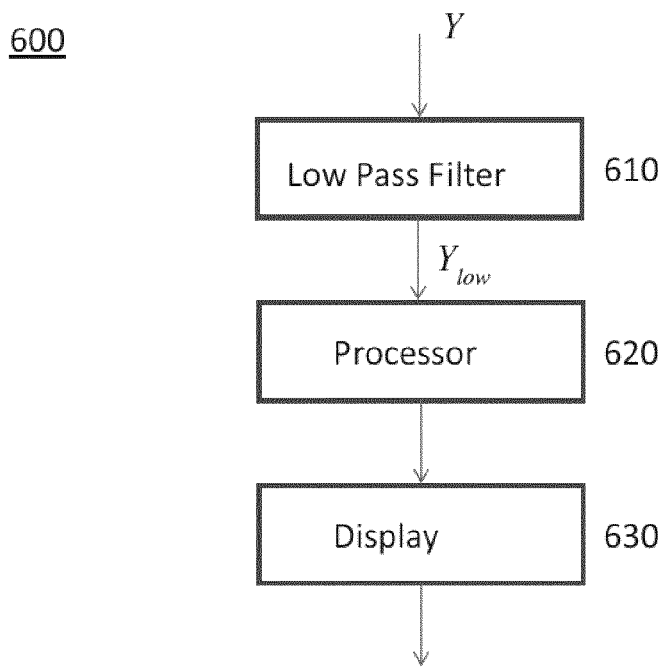
FIG. 6 shows an embodiment of a system including a color expansion apparatus under the present principles, including the display of expanded images.

FIG. 6 shows an embodiment of a system 600 for reproducing an image on a display having a higher peak luminance value than the image. The system comprises a low pass filter 610, operating on an image luminance component. The output of low pass filter 610 is in signal connectivity with an input of Processor 620. Processor 620 expands colors of the image. The output of Processor 620 is in signal connectivity with the input of Display 630. Display 630 displays expanded colors of the image.

FIG. 7 shows an embodiment of a color expansion apparatus 700 for expanding colors of an image in order to reproduce the expanded image on a display device having a higher peak luminance. The apparatus comprises a low pass filter (not shown but similar to ref. 610 on FIG. 6), a first look up table (LUT 1) 710 storing precomputed values of the first expansion function as described above, a second look up table (LUT 2) 720 storing precomputed values of the second expansion function as described above, a third look up table (LUT 3) 730 storing precomputed values of chrominance expansion factors defined as a function $E'(Y_{low})$ of low pass filtered luminance values, and a processor (not shown but similar to ref. 620 on FIG. 6) configured to implement notably multipliers 740, 750, 760, 770, and 780 as defined below.

The input to LUT 710 is a low pass filtered luminance component from the output of low pass filter (not shown). LUT 710 stores values of the function $f(Y_{low}) = (Y_{low})^{(E(Y_{low})-d1(Y_{low}))}$, i.e. of a low pass filtered luminance component scaled exponentially using an exponent function $E(Y_{low})$ and a first detail function d1 depending only on the low pass filtered luminance component. The output of LUT 710 is in signal connectivity with one input of a first multiplier 740. The other input to multiplier 740 comes from the output of a second look up table (LUT 2) 720. The input to LUT 720 is the luminance component of an image. LUT 720 stores values of the function $g(Y) = Y^{(d2(Y)-1)}$, i.e. of this luminance component scaled exponentially by a second detail function d2 depending only on the luminance component. The output of multiplier 740 is sent to a first input of another multiplier 760. The second input of multiplier 760 is the luminance component of the image. The output of multiplier 760 is the expanded values $Y_{exp}$ of the luminance component of an image.

Also comprising apparatus 700, a third look up table (LUT3) 730 takes the low pass filtered luminance component as its input. LUT 730 stores E'(E) values, i.e. values depending on the other exponent function E'(E) adapted to scale the chromatic component of the colors. The output of LUT 730 is sent to one input of multiplier 750. The second input of multiplier 750 is the output of multiplier 740. The output of multiplier 750 is then sent to multiplier 770 and multiplier 780. The respective chrominance components U, V are sent respectively to multiplier 770 and multiplier 780. The chrominance components can be multiplexed in time so that only one multiplier is needed to apply the exponent map to both chrominance components. The output of multipliers 770 and 780 are the expanded chrominance components, $U_{exp}$ and $V_{exp}$, for example.

The present description illustrates the present principles. It will thus be appreciated that those skilled in the art will be able to devise various arrangements that, although not explicitly described or shown herein, embody the present principles and are thereby included within the present principles.

It will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof. Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications can be effected therein by one of ordinary skill in the pertinent art without departing from the scope of the present principles. All such changes and modifications are intended to be included within the scope of the present principles as set forth in the appended claims.

The invention claimed is:

1. A color dynamic range expansion module for expanding a dynamic range of colors of an image, wherein said colors are represented in a color space separating a luminance component from chrominance components, comprising:
    a low pass filter for low pass filtering said luminance component;
    a first look up table storing precomputed values of a first expansion function of only low pass filtered luminance values;
    a second look up table storing precomputed values of a second expansion function of only luminance values; and
    a processor configured to multiply an output of said second look up table corresponding to an input luminance value of a color to expand by an output of said first look up table corresponding to an input low pass filtered luminance value associated with said input luminance value.

2. The color dynamic range expansion module according to claim 1, wherein said first expansion function is defined as said low pass filtered luminance component scaled exponentially using an exponent function and a first detail function $d1(Y_{low})$, each function being a function of only said low pass filtered luminance component.

3. The color dynamic range expansion module according to claim 1, wherein said second expansion function is defined as said luminance component scaled exponentially using a second detail function $d2(Y)$ being a function of only said luminance component.

4. An electronic device incorporating the color dynamic range expansion module of claim 1.

5. The electronic device according to claim 4, wherein said electronic device is selected from a group consisting of a TV set; a mobile device;
    a communication device; a game device; a tablet; a smartphone; a laptop; a camera; an encoding chip; a server.

6. A method for expanding a dynamic range of colors of an image, wherein said colors are represented in a color space separating a luminance component from chrominance components, comprising:
    low pass filtering said luminance component;
    high pass filtering said luminance component;
    scaling said high pass filtered luminance component exponentially using a detail function being a function of said low pass filtered luminance component;
    expanding a value range for said luminance component by exponentially scaling said low pass filtered luminance component using an exponent function being a function of said low pass filtered luminance component; and weighting said scaled low pass filtered luminance component by said scaled high pass filtered luminance component.

7. The method for expanding the dynamic range of colors according to claim 6, wherein said high pass filtering is obtained by dividing said luminance component by said low pass filtered luminance component.

8. The method for expanding the dynamic range of colors according to claim 6, wherein said weighted scaled low pass filtered luminance component ($Y_{exp}$) is a product:
- of said low pass filtered luminance component scaled exponentially ($Y_{low}^{(E(Ylow)-d(Ylow))}$) using said exponent function $E(Y_{low})$ and using also a first detail function $d1(Y_{low})$ of only said low pass filtered luminance component; and
- of said luminance component scaled exponentially ($Y^{d(Y)}$) using a second detail function $d2(Y)$ of only said luminance component.

9. The method for expanding the dynamic range of colors according to claim 6 further comprising:
- expanding a value range of at least one chrominance component of said image by a chrominance expansion factor.

10. The method for expanding the dynamic range of colors according to claim 9 wherein said chrominance expansion factor corresponds to said expanded luminance component normalized by said luminance component.

11. The method for expanding the dynamic range of colors according to claim 9 wherein said chrominance expansion factor is a function of said exponent function scaled by said expanded luminance component normalized by said luminance component.

12. The method for expanding the dynamic range of colors according to claim 9 wherein said chrominance expansion factor is a function of said exponent function or of said low pass filtered luminance component, said function being scaled by said expanded luminance component normalized by said low pass filtered luminance component.

13. A non-transitory storage medium carrying instructions for causing a computing device to perform a method for expanding a dynamic range of colors of an image, wherein said colors are represented in a color space separating a luminance component from chrominance components, the method comprising:
- low pass filtering said luminance component;
- high pass filtering said luminance component;
- scaling said high pass filtered luminance component exponentially using a detail function being a function of said low pass filtered luminance component;
- expanding a value range for said luminance component by exponentially scaling said low pass filtered luminance component using an exponent function being a function of said low pass filtered luminance component; and
- weighting said scaled low pass filtered luminance component by said scaled high pass filtered luminance component.

14. The non-transitory storage medium according to claim 13, wherein said high pass filtering is obtained by dividing said luminance component by said low pass filtered luminance component.

15. The non-transitory storage medium according to claim 13, wherein said weighted scaled low pass filtered luminance component ($Y_{exp}$) is a product:
- of said low pass filtered luminance component scaled exponentially ($Y_{low}^{(E(Ylow)-d(Ylow))}$) using said exponent function $E(Y_{low})$ and using also a first detail function $d1(Y_{low})$ of only said low pass filtered luminance component; and
- of said luminance component scaled exponentially ($Y^{d(Y)}$) using a second detail function $d2(Y)$ of only said luminance component.

16. The non-transitory storage medium according to claim 13, wherein the method further comprises expanding a value range of at least one chrominance component of said image by a chrominance expansion factor.

* * * * *